United States Patent
Morgan et al.

(10) Patent No.: US 7,143,141 B1
(45) Date of Patent: Nov. 28, 2006

(54) SYSTEM FOR PROVIDING INTERNET-RELATED SERVICES IN RESPONSE TO A HANDHELD DEVICE THAT IS NOT REQUIRED TO BE INTERNET-ENABLED

(75) Inventors: Jeffrey A. Morgan, Cupertino, CA (US); Bill Serra, Palo Alto, CA (US); John C. Schettino, Jr., San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/490,553

(22) Filed: Jan. 25, 2000

(51) Int. Cl.
*G06F 15/16* (2006.01)

(52) U.S. Cl. .................. 709/217; 709/219; 709/229

(58) Field of Classification Search ........... 707/10.4, 707/104.1, 1, 10; 345/173, 835; 375/222, 375/219; 455/572, 445, 456.3; 709/217, 709/226, 241, 218, 229; 379/93.25
See application file for complete search history.

(56) References Cited

U.S. PATENT DOCUMENTS

| | | | |
|---|---|---|---|
| 5,539,665 A | | 7/1996 | Lamming |
| 5,721,908 A | * | 2/1998 | Lagarde et al. ............ 707/10 |
| 5,862,321 A | | 1/1999 | Lamming |
| 5,895,471 A | | 4/1999 | King et al. ................ 707/104 |
| 5,937,041 A | * | 8/1999 | Cardillo et al. ......... 379/93.25 |
| 5,944,791 A | * | 8/1999 | Scherpbier ................ 709/218 |
| 5,974,085 A | * | 10/1999 | Smith ........................ 375/222 |
| 6,013,007 A | | 1/2000 | Root et al. |
| 6,021,433 A | | 2/2000 | Payne et al. |
| 6,104,334 A | | 8/2000 | Allport |
| 6,131,130 A | | 10/2000 | Van Ryzin |
| 6,169,897 B1 | * | 1/2001 | Kariya ..................... 455/456.3 |
| 6,189,788 B1 | | 2/2001 | Sherman |
| 6,192,407 B1 | * | 2/2001 | Smith et al. ................ 709/229 |
| 6,199,753 B1 | | 3/2001 | Tracy et al. |
| 6,243,596 B1 | * | 6/2001 | Kikinis ..................... 455/572 |
| 6,249,810 B1 | | 6/2001 | Kiraly |
| 6,308,221 B1 | * | 10/2001 | Perlman et al. ............ 709/241 |
| 6,311,216 B1 | * | 10/2001 | Smith et al. ................ 709/226 |
| 6,314,094 B1 | | 11/2001 | Boys |
| 6,314,432 B1 | * | 11/2001 | Potts, Jr. .................. 707/104.1 |
| 6,334,056 B1 | * | 12/2001 | Holmes et al. ............ 455/445 |
| 6,389,278 B1 | * | 5/2002 | Singh ....................... 455/414.3 |
| 6,401,085 B1 | * | 6/2002 | Gershman et al. ............ 707/4 |
| 6,466,203 B1 | * | 10/2002 | Van Ee ..................... 345/173 |

(Continued)

FOREIGN PATENT DOCUMENTS

JP    10172133    5/1998

(Continued)

OTHER PUBLICATIONS

European Search Report, Application No.:09/490553, Date: Jan. 25, 2000.

*Primary Examiner*—Bonjob Jaroenchonwanit
*Assistant Examiner*—Kenny Lin

(57) ABSTRACT

A system for providing Internet-related services to a handheld device is described. The system includes a client module embedded in the handheld device to enable the handheld device to send a Universal Resource Locator (URL) via a communication link. The URL indicates a desired web page. The system also includes a receiver that receives the URL sent from the handheld device via the communication link. A web access module is coupled to the receiver and external Internet to access and retrieve the desired web page from a remote web server via the external Internet. A render system is coupled to the web access module to render the retrieved web page to the user of the handheld device.

34 Claims, 6 Drawing Sheets

U.S. PATENT DOCUMENTS

| | | |
|---|---|---|
| 6,477,565 B1 * | 11/2002 | Daswani et al. ............ 709/217 |
| 6,484,205 B1 | 11/2002 | Byford |
| 6,515,988 B1 | 2/2003 | Eldridge et al. |
| 6,601,102 B1 | 7/2003 | Eldridge et al. |
| 6,643,284 B1 | 11/2003 | Inoue et al. |
| 6,738,841 B1 | 5/2004 | Wolff |
| 6,757,749 B1 | 6/2004 | Aoki et al. |
| 6,792,452 B1 | 9/2004 | Philyaw |
| 2002/0002592 A1 | 1/2002 | Aoki |
| 2002/0085515 A1 | 7/2002 | Jaynes et al. |

FOREIGN PATENT DOCUMENTS

| | | |
|---|---|---|
| JP | 10173844 | 8/1998 |

* cited by examiner

US 7,143,141 B1

SYSTEM FOR PROVIDING INTERNET-RELATED SERVICES IN RESPONSE TO A HANDHELD DEVICE THAT IS NOT REQUIRED TO BE INTERNET-ENABLED

BACKGROUND OF THE INVENTION

1. Field of the Invention

The present invention pertains to the Internet and World Wide Webs. More particularly, this invention relates to a system for providing Internet-related services to mobile handheld devices.

2. Description of the Related Art

As is known, the Internet typically refers to a number of data service systems connected together via a high speed interconnect network. Each data service system typically includes web servers that host contents for various customers. The web servers can also host applications. Each of the data service systems is typically implemented by a computer system (e.g., a server computer system). A number of remote user terminals may be connected to a data service system via an interconnect network (e.g., a telephone network). This allows users at the user terminals to access the contents hosted in various data service systems. Each user terminal is typically implemented by a computer system (e.g., a personal computer) and is equipped with a web browser that allows the user terminal to access the contents and/or applications hosted in various data service systems.

Such a prior art scheme, however, bears disadvantages. One disadvantage is that the scheme requires the use of the user terminal for a user to access contents hosted in the Internet. If a user wants to access the Internet at a particular place, the user must have a user terminal at that place. Without the user terminal, no Internet access can be offered to the user.

Another disadvantage is that the scheme lacks flexibility, mobility, and convenience for a user to access the Internet. As is known, the user terminal is typically a personal computer. Although the personal computer can be made small and portable (e.g., a notebook computer), it is still inconvenient for the user to carry the machine around. Further miniaturization of the computer (e.g., palm-top personal organizer) typically takes away some important components (e.g., floppy drive) of the machine, and/or makes the machine not user friendly (e.g., shrinking the display or keyboard so it is really uncomfortable for the user to use the machine). Physical constraints may also limit or prevent further miniaturization.

Moreover, peripheral devices (e.g., printers, scanners, and projectors) are typically left behind when a user carries a computer around. When the user uses the computer as a user terminal to access the Internet and wants to print or projects a particular content, the user must also carry the peripheral devices along with the computer. For example, if the user anticipates the use of a printer and a projector at a remote location, the user must carry both along with the computer. This adds inconvenience to the user and restricts mobility of the user terminal. If the user connects the computer to a borrowed projector or printer, the user has to make sure that the computer has the appropriate software for the projector or appropriate printer driver software to drive the borrowed printer.

In addition, the place must be equipped with network connection so that the user can connect the user terminal to the network. This causes the scheme to lack flexibility. For example, if the interconnect network is the telephone network, the user must find the telephone socket to connect the user terminal to the network. Further, the user terminal must be equipped with the appropriate kind of network capability. For example, if the user terminal is connected with a telephone network, the user terminal must be equipped with a modem. A user terminal without a modem cannot function when connected to a telephone network. If the user terminal is connected with a LAN (local area network) network, the user terminal must be equipped with a LAN card. A user terminal without a LAN card cannot function when connected to a LAN network.

Thus, there exists a need for an arrangement that allows a user to access the Internet everywhere without carrying the computer user terminal and its peripheral devices.

SUMMARY OF THE INVENTION

One feature of the present invention is to allow handheld devices not equipped with Internet access functions to access Internet.

Another feature of the present invention is to provide mobile Internet access function for handheld devices while not requiring the handheld devices to be Internet-enabled.

A further feature of the present invention is to allow the user of a mobile and simple handheld device to receive Internet-related and high quality output services that cannot be provided by the handheld device.

A system for providing Internet-related services to a handheld device is described. The system includes a client module embedded in the handheld device to enable the handheld device to send a Universal Resource Locator (URL) via a communication link. The URL indicates a desired web page at a remote web server. The system also includes a receiver that receives the URL sent from the handheld device via the communication link. A web access module is coupled to the receiver and external Internet to access and retrieve the desired web page from the remote web server via the external Internet. A render system is coupled to the web access module to render the retrieved web page to the user of the handheld device.

A system for providing Internet-related services to a handheld device is also described. The system includes a receiver that receives a Universal Resource Locator (URL) from the handheld device via a communication link. The URL indicates a desired web page. A web access module is coupled to the receiver and external Internet to access and retrieve the desired web page from a remote web server via the external Internet. A render system is coupled to the web access module to render the retrieved web page to the user of the handheld device. The receiver, the web access module, and the render system all physically reside within the system while the handheld device is physically separated from the system.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
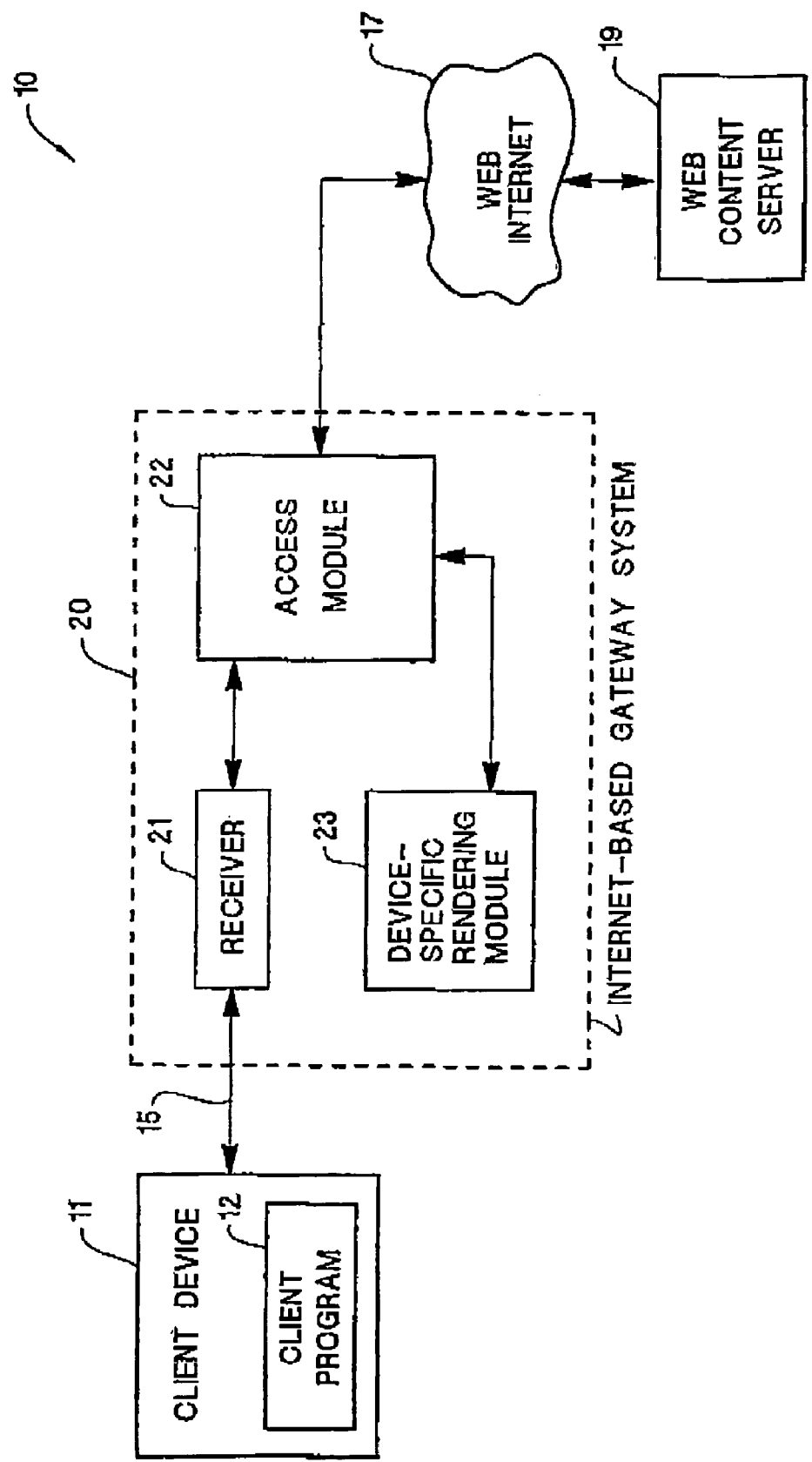
FIG. 1 shows an Internet-based data access network system that implements one embodiment of the present invention, wherein the network system includes a gateway system and a client device with a client program.

FIG. 1 shows an Internet-based data access network system 10 that includes a gateway system 20 and a client device 11 (having a client program 12) that together implement one embodiment of the present invention. In addition to the gateway system 20 and the client device 11, the data access network system 10 includes the Internet 17 and a web content server 19.

In one embodiment, the data access network system 10 is an Internet network system. In another embodiment, the data access network system 10 is an Intranet network system. In a further embodiment, the data access network system 10 is a combination of Internet and Intranet network systems. An open standard communication protocol is used for communications within the data access network system 10. In one embodiment, the open standard communication protocol is the Hyper Text Transport Protocol (HTTP).

Briefly, the client device 11 is a handheld device that stores Universal Resource Locators (URLs) for information and/or services the user of the client device 11 commonly or frequently accesses. The gateway system 20 provides Internet-related services and high quality output services to the client device 11. This means that the client device 11 can be made small and easy to carry while still offering its user Internet related services and high quality output services wherever the user is (i.e., through the gateway system 20).

As will be described in more detail later, the gateway system 20 is connected to the Internet 17. The gateway system 20 includes a receiver 21 that receives URLs from the client device 11 via a wireless communication link. The gateway system 20 also includes a web access module 22 that allows the gateway system 20 to access contents hosted in the content server 19 (or other servers of the Internet 17) based on the URLs sent from the client device 11. The web access module 22 is connected to the Internet 17 that is external to the gateway system 20. The gateway system 20 also includes a rendering module 23 that renders (e.g., prints, displays, plays, or projects) the retrieved contents to the user of the client device 11.

In this arrangement, the client device 11 does not need a web browser. This means that the client device 11 does not need to be equipped with Internet accessing functionality and is not required to attach to a network. The gateway system 20 provides the Internet access function to the client device 11. The user of the client device 11 only needs to store on the client device 11 the URLs of the desired content/service sites. The gateway system 20, having received the selected URL from the client device 11, retrieves the content/service in accordance with the URL and renders the content/service using its rendering module 23. Like a payphone, the gateway system 20 can be placed in various public or private locations (e.g., conference or meeting rooms, hotel rooms, hotel lobbies, airports, bus or train terminals, shopping centers, etc).

In addition, the gateway system 20 allows the client device 11 to be made very small and only have limited storage, processing, and display capabilities while allowing the user of the client device 11 to still be able to access rich information of the contents hosted on the Internet 17 or the content server 19. Moreover, the gateway system 20 allows the user of the client device 11 to receive high quality output services such as printing, projecting, and displaying for the retrieved contents without carrying any peripheral output device. The gateway system 20 and the client device 11 will be described in more detail below, also in accordance with FIGS. 1–6.

Referring to FIG. 1, the remote web content server 19 is connected to the Internet 17. The web content server 19 may be located within one data service system or formed by a number of data service systems connected together. FIG. 1 only shows one such server for illustration purposes. In practice, many more servers may be included in the data access network system 10. The server 19 can be implemented by any known means.

In addition, the web content server 19 is not limited to just web server. The server 19 may be any kind of content server. For example, the server 19 may be a news server, an e-mail server, an application server, or an e-commerce server.

The content server 19 is connected to the gateway system 20 via Internet 17. The Internet 17 is formed by connecting a number of data service systems together via high speed and high bandwidth networks. The Internet 17 is known in the art.

The content server 19 hosts contents that can be accessed by any source external to the content server 19. This means user terminals connected to the data service systems within the Internet 17 can access the contents hosted in the content server 19. The above described open standard communication protocol is used for communications through the Internet 17. This also means that the gateway system 20 can access the contents hosted in the content server 19 via the Internet 17.

In one embodiment, the gateway system 20 is a stationary system. This means that the gateway system 20 is fixed at the location where it is placed. In another embodiment, the gateway system 20 is portable. In addition, the gateway system 20 has all of its components located in a single enclosure. Alternatively, the components/modules of the gateway system 20 can be separately implemented in various systems.

The client device 11 is a portable handheld electronic device that is relatively very easy to carry. In one embodiment, the client device 11 is a pager or a watch. In another embodiment, the client device 11 is a cellular phone or wireless satellite phone. In a further embodiment, the client device 11 is a palm-top computer system or personal organizer. The client device 11 can be any kind of information appliance. Alternatively, the client device 11 can be any kind of small and portable handheld electronic device or appliance with limited processing, storage, and display resources.

The client device 11 does not require Internet access function. This means that the client device 11 does not require a Web Browser software and Internet-related network access module. However, this does not mean that the client device 11 must not have Internet access function. The client device 11 may nonetheless be equipped with the Internet access function although such function is not required for the client device 11. For example, when the client device 11 is a pager, cellular phone, or personal organizer (e.g., Jornada personal organizer available from Hewlett-Packard Company of Palo Alto, Calif.), the client device 11 may have Internet access through the device's wireless communication channel.

The client device 11 has a local communication module (not shown) for communications with the gateway system 20. The communication module of the client device 11 allows the client device 11 to transfer data to the external gateway system 20 via a wireless communication link or channel 15 using a simple and open standard communication protocol (e.g., the protocol used in remote controls). The protocol is simple because it only needs to handle sending a few bytes of data.

In one embodiment, the communication link 15 employs radio frequency communication. In another embodiment, the communication link 15 is an infrared communication link. In a further embodiment, the communication link 15 is a laser communication link. Alternatively, other wireless or wire communication means may be used to allow the client device 11 to transfer data to the gateway system 20.

In one embodiment, the communication module of the client device 11 only transfers data to the gateway system 20 and does not receive any data from the gateway system 20. This allows the communication module of the client device 11 to be simple. Alternatively, the communication module of the client device 11 can transfer data to and receive data from the gateway system 20. The communication module of the client device 11 can be implemented using any known means.

The client device 11 also includes a storage module (also not shown in FIG. 1) that stores a number of URLs selected by the user of the client device 11. This means that the user of the client device 11 can store URLs for information or services accessed by the user on the Internet in the storage module of the client device 11. The storage module of the client device 11 can also receive URLs from external devices (not shown). These URLs may refer to information or services providing news, appointments, e-mails, stock market quotes, e-commerce. The URLs may also refer to corporate information such as brochures, presentations, contracts, etc.

The storage module can be a volatile or non-volatile storage means. The stored URLs can be inputted by the user into the client device 11 manually, or transmitted to the client device 11 electronically. In addition, if the client device 11 has web or Internet access function, the URLs can be embedded in a hyperlink text of a web page displayed on the client device 11.

The client device 11 includes a client program 12. In one embodiment, the client program 12 is a software embedded in the client device 11. In another embodiment, the client program 12 is implemented by firmware. The client program 12 may also be implemented by hardware.

The client program 12 is used to cause the communication module of the client device 11 to send a selected URL to the gateway system 20. The selected URL can be the standard URL address or embedded in a hyperlink. The user of the client device 11 selects the selected URL and then clicks on an activation icon to trigger the client program 12 to cause the selected URL to be sent to the gateway system 20.

During operation, the user of the client device 11 first selects one of the URLs stored or received in the client device 11 through the user interface (also not shown in FIG. 1) of the client device 11. As described above, URLs can be in the actual URL form (e.g., "www.hp.com") or embedded in hyperlinks. In addition, the URLs can be stored as bookmarks. The user of the client device 11 first selects the selected URL. The user then activates the client program 12.

Figure 2:
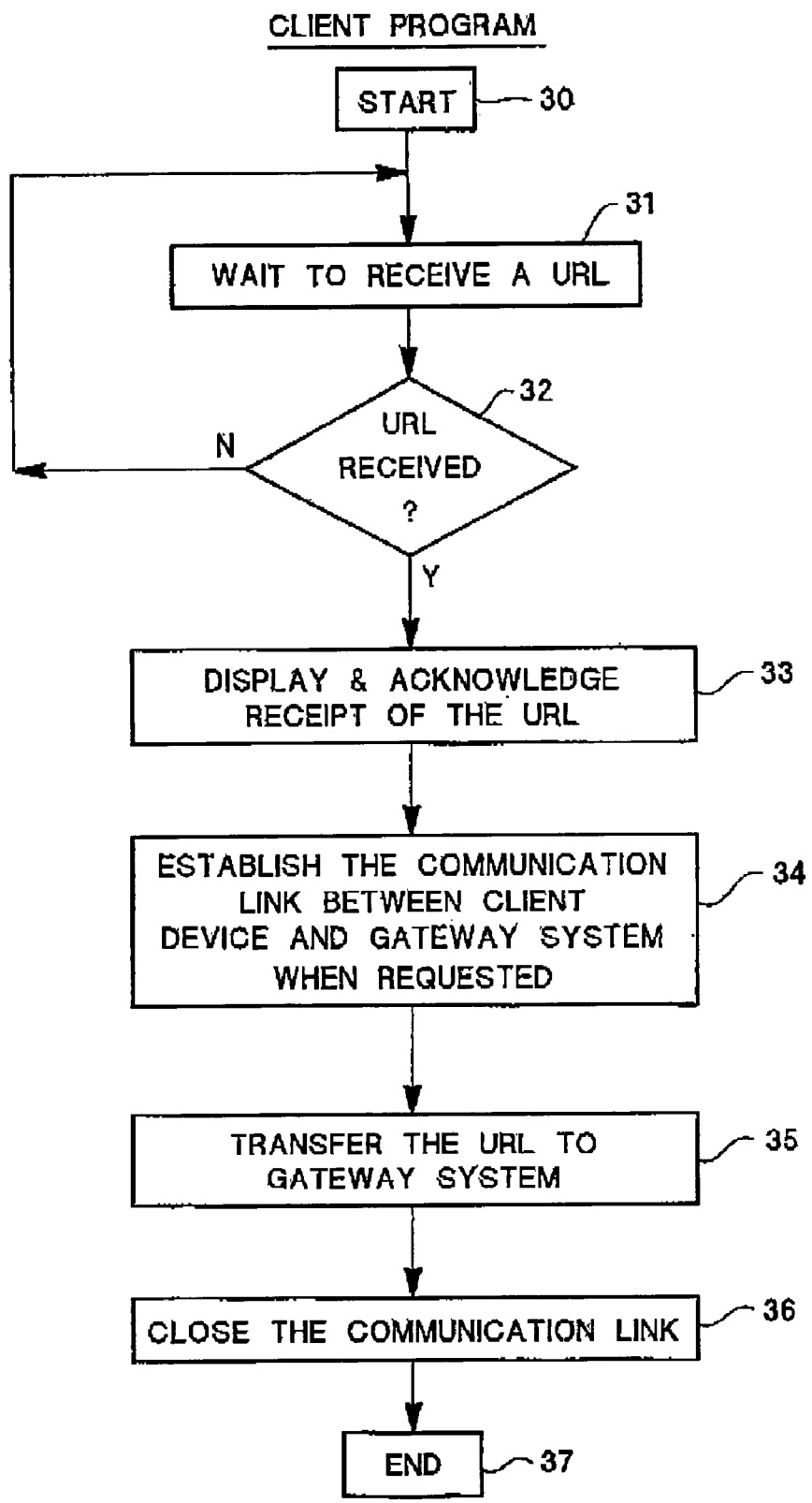
FIG. 2 shows in flow chart diagram form the process of the client program.

This is done by clicking on an activation icon of the client device 11, or an activation button of the client device 11. The activation then causes the client program 12 to cause the communication module of the client device 11 to send the selected URL to the receiver 21 of the gateway system 20. FIG. 2 shows in flow chart diagram form the process of the client program 12, which will be described in more detail below.

As can be seen from FIG. 2, the process starts at the step 30. At the steps 31 and 32, the client program 12 waits to receive the URL selected by the user of the client device 11. As the step 33, the received URL is displayed on the client device 11 and acknowledged by the client program 12. At the step 34, the client program 12 causes the communication module of the client device 11 to establish communication link between the client device 11 and the gateway system 20. The communication occurs when the user requests it. As can be seen from FIG. 2, the communication link is established with the receiver 21 of the gateway system 20. As also be described above, the communication link is, for example, a wireless communication link. Then the client program 12 sends the received URL to the gateway system 20 via the established communication link at the step 35.

In one embodiment, the client program 12 includes means for providing security support to the URLs sent to the gateway system 20. In this case, the client program 12 may embed a simple password protection into the transferred URLs. If the URL addresses a restricted site that requires user ID and password, the client program 12 may send in the next transmission the user ID and password. Alternatively, the user can manually enter the user ID and password directly through the gateway system 20. In another embodiment, the client program 12 has an encryption mechanism that encrypts the URL transferred.

At the step 36, the client program 12 closes the established communication link. The process then ends at the step 37.

Figure 5:
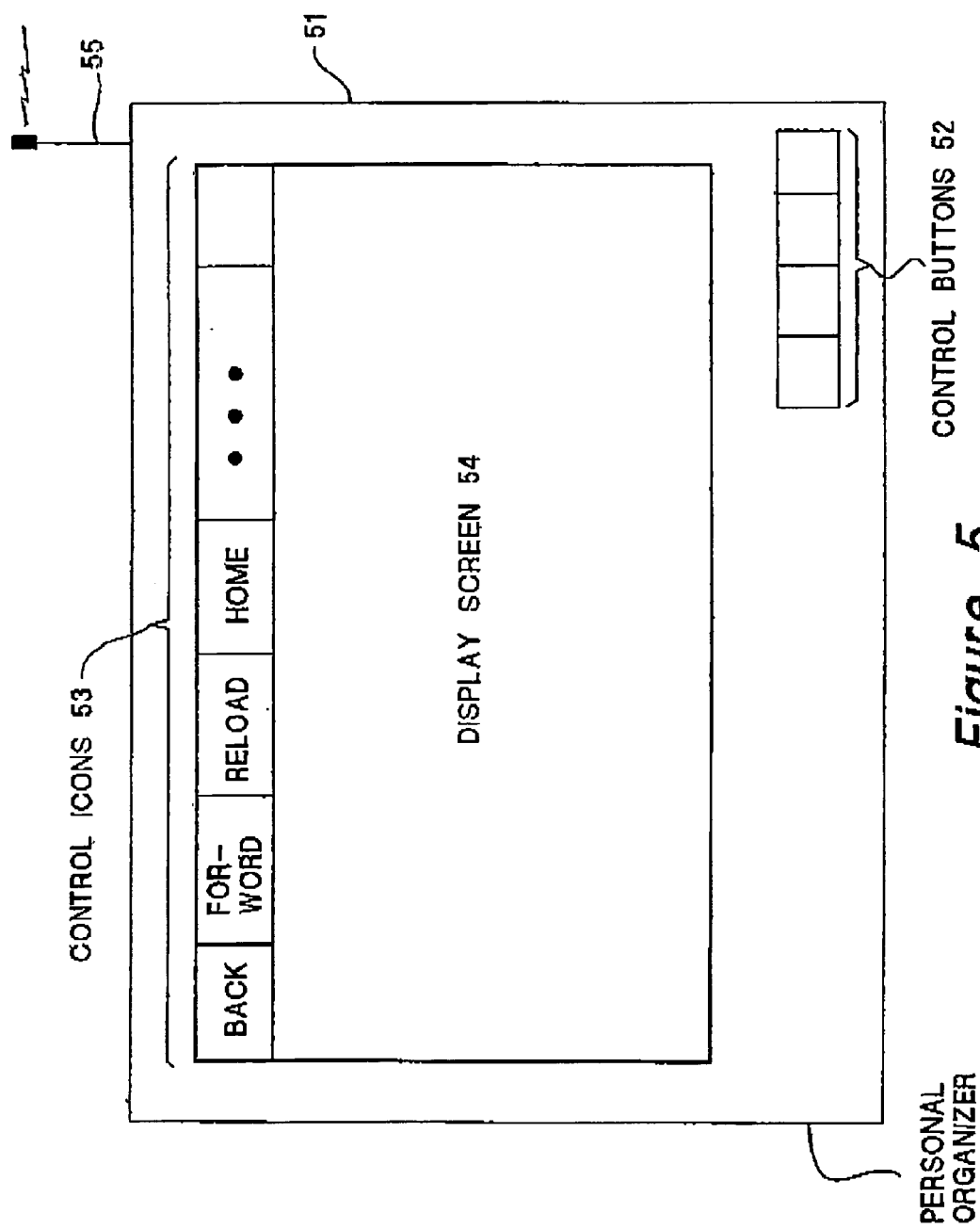
FIG. 5 shows one specific embodiment of the client device of FIG. 1.

FIG. 5 shows one specific embodiments of the client device 11 of FIG. 1. FIG. 5 shows that the client device 11 of FIG. 1 is implemented by an Internet-enabled personal organizer 51. The organizer 51 receives web contents via its networking function (including the antenna 55). The web contents may include desired URLs for the user of the organizer 51. The organizer 51 also includes a display screen 54 that displays the retrieved web contents. The organizer 51 also includes a user interface function (i.e., the control icons 53 and control buttons 52 that allow the user of the device 51 to select a URL and to send the selected URL to the gateway system 20 of FIG. 1. Alternatively, the organizer 51 may be a pager that does not support Internet access function. In this case, the URL information can be received by the pager and displayed on the display screen or window of the pager for the user to select.

Figure 3:
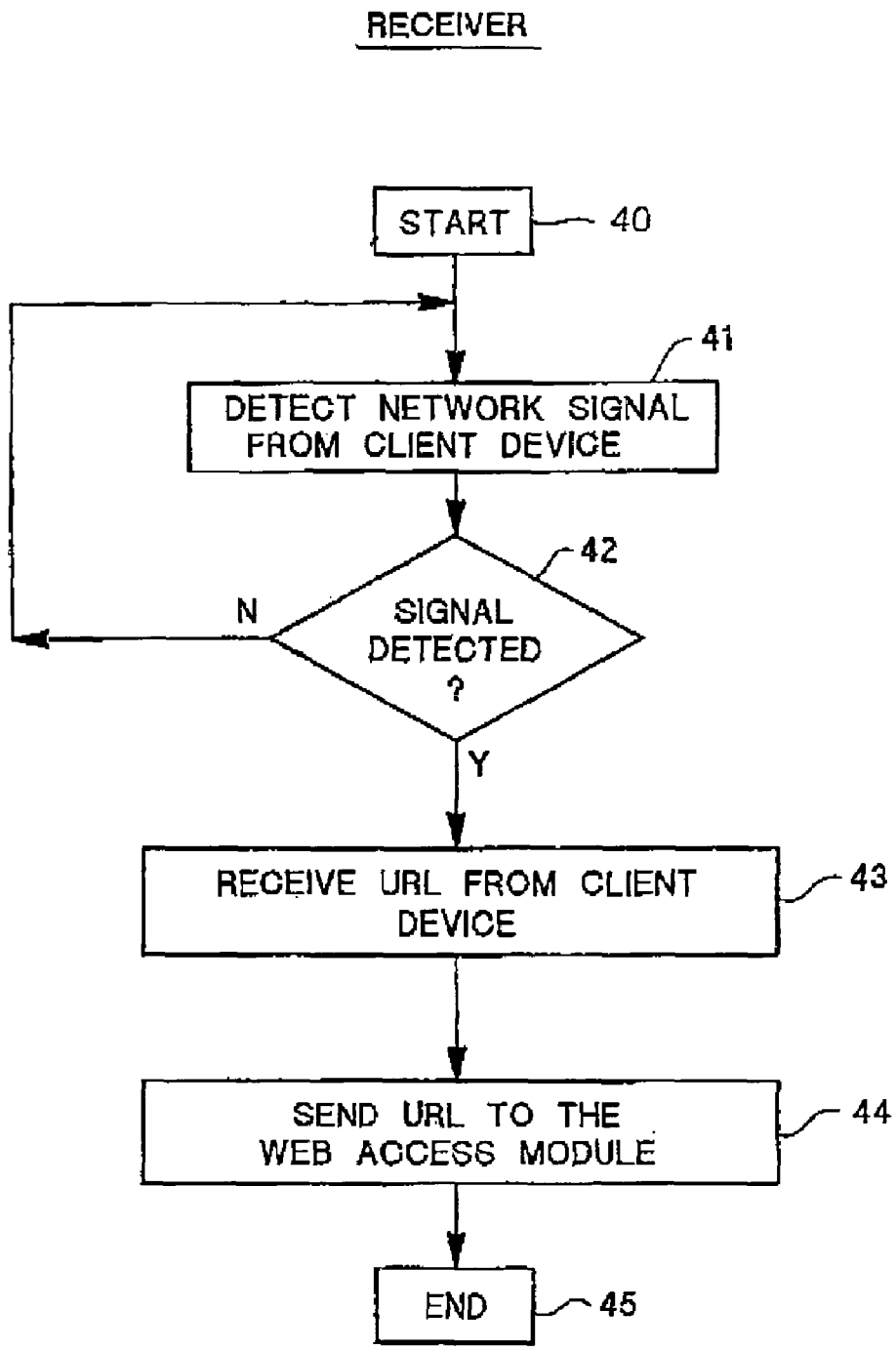
FIG. 3 shows in flow chart diagram form the process of the receiver inside the gateway system.

Referring back to FIG. 1, the structure and operation of the gateway system 20 is now described. As described above, the gateway system 20 includes the receiver 21, the web access module 22, and the device-specific rendering module 23. The receiver 21 is used to establish communication link with the client device 11 and to receive URLs transferred from the client device 11. The receiver 21 can be maintained at receiving mode all the time or can be activated by the user of the client device 11 (e.g., after the user pays the required fee). The receiver 21 can be implemented using any known local communication technology. For example, if the communication link 15 employs radio communication, the receiver 21 is a radio receiver circuit. If the communication link 15 is an infrared communication link, then the receiver 21 is an infrared receiver circuit. If the communication link 15 is a laser communication link, the receiver 21 is a laser receiver circuit. The receiver 21 may also include a decryption function to decipher any encrypted transmission from the client device 11. FIG. 3 shows the flowchart of the process of the receiver 21 in receiving the URLs transferred from the client device 11.

In FIG. 3, the process starts at the step 40. At the steps 41 and 42, the receiver 21 tries to detect communication signal from the client device 11 to establish the communication link with the client device 11. At the step 43, the receiver 21 receives the transferred URL from the client device 11. In one embodiment, the receiver 21 also has encryption and decryption support such that if the transferred URL is encrypted, the receiver 21 can decrypt the URL. At the step 44, the receiver 21 sends the received URL to the web access module 22. The process then ends at the step 45.

Referring back to FIG. 1, the web access module 22 receives transferred URLs from the receiver 21. The web access module 22 then accesses the Internet 17 or the content server 19 via the Internet 17. In one embodiment, the web access module 22 receives one URL from the receiver 21 and then retrieves the corresponding content from a remote content server specified by the URL. Then the web access module 22 receives a next URL from the receiver 21. In another embodiment, the web access module 22 keeps receiving URLs transferred to the receiver 21 without interrupting its current web accessing operation. The web access module 22 is essentially a web browser without the rendering function. The rendering function is implemented by the device-specific rendering module 23. This means that the rendering of the retrieved contents specified by the URLs from the receiver 21 depends on the type and function of the rendering module 23. If the rendering module 23 is a printer system, then the rendering function is to print the content out. If the rendering module 23 is a display system, then the rendering function is to render the content on the display screen.

Figure 4:
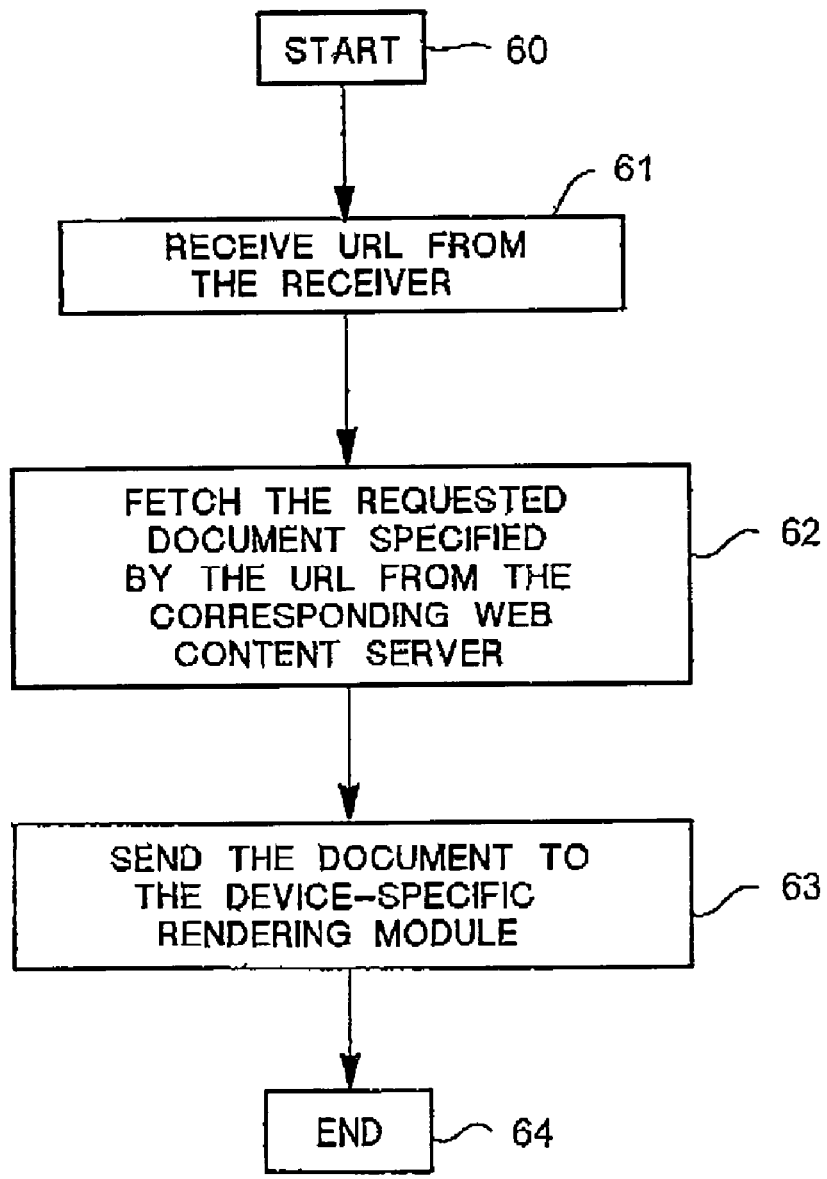
FIG. 4 shows in flow chart diagram form the process of the web access module inside the gateway system.

The web access module 22 can be implemented using any known web browser technology (e.g., Microsoft's Internet Explorer or Netscape's Communicator). FIG. 4 shows in flowchart diagram form the operation of the web access module 22, which will be described in more detail below.

In FIG. 4, the process of the web access module 22 starts at the step 60. At the step 61, the web access module 22 (FIG. 1) receives the URL from the receiver 21. The web access module 22 then fetches the requested content in from the corresponding remote content server (or the content server 19) specified by the URL via the Internet 17 at the step 62. At the step 63, the web access module 22 sends the retrieved content to the rendering module 23 of the gateway system 20 for high quality rendering.

Referring to FIG. 1, once the web access module 22 retrieves the content from a remote content server via the Internet 17 specified by the URL received from the receiver 21, web access module 22 sends the retrieved content to the rendering module 23. The rendering module 23 then renders (e.g., displays or prints) the retrieved content so the user of the client device 11 can view the content.

In one embodiment, the device-specific rendering module 23 is a printer system. In another embodiment, the rendering module 23 is a display system. In a yet another embodiment, the rendering module 23 is a video or audio (e.g., music) player system. In a further embodiment, the rendering module 23 is a projection system. Alternatively, the rendering module 23 can be other types of output device or system.

Thus, the rendering function of the gateway system 20 is device-specific and depends on the type of output device the rendering module 23 employs. This means that the rendering function of the gateway system 20 is also device-specific and depends on the type of device implemented for the rendering module 23. For example, if the rendering module 23 is a printer system, then the rendering function of the gateway system 20 is to print the retrieved content. If the rendering module 23 is a display system, then the rendering function of the gateway system 20 is to render the retrieved content on the display screen of the rendering module 23. If the rendering module 23 is a display system with a user interface, the user of the client device 11 can. If the rendering module 23 is a display system with a user interface, the user of the client device 11 can also browse the Internet 17 from the rendering module 23.

Figure 6:
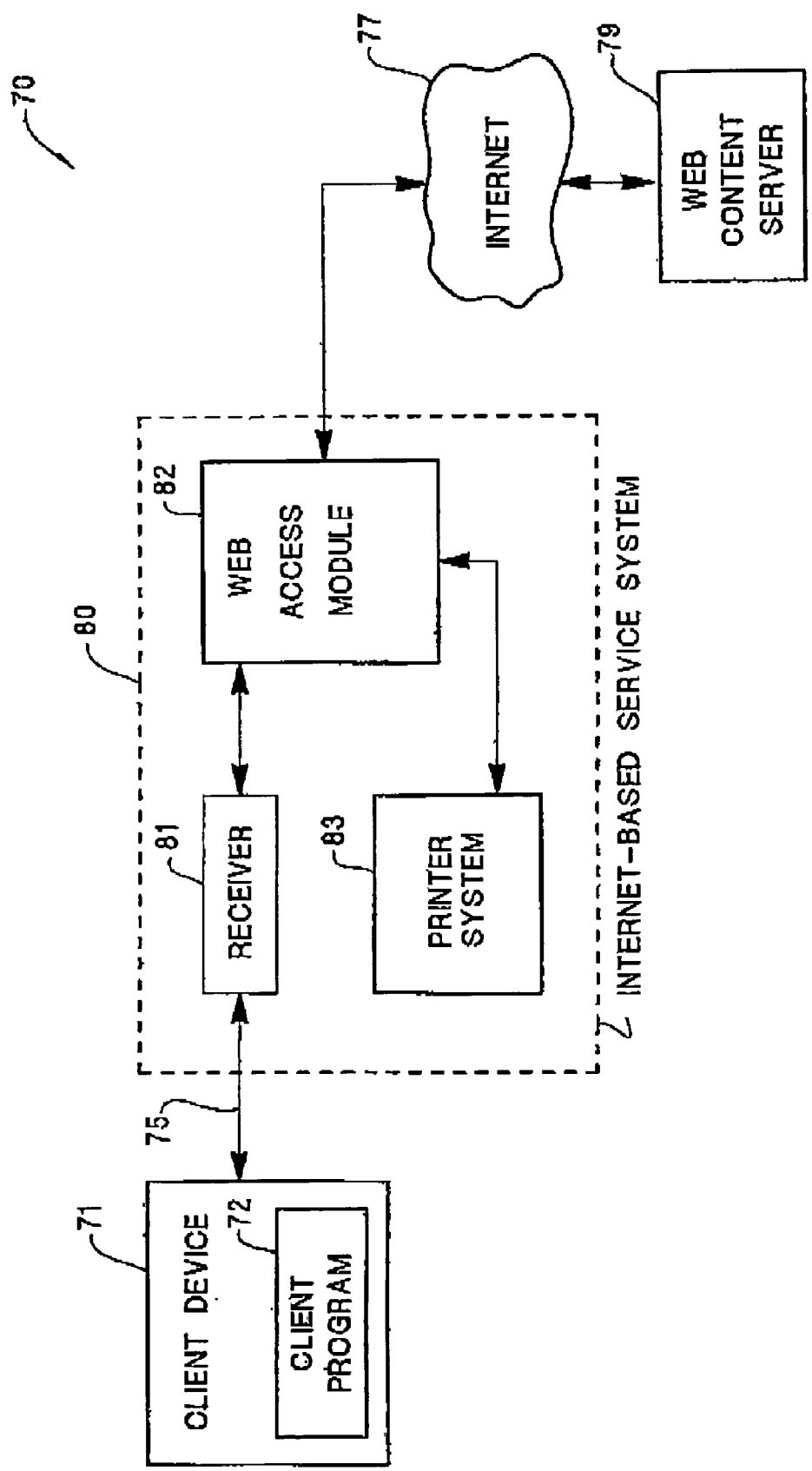
FIG. 6 shows one specific embodiment of the rendering module of FIG. 1.

FIG. 6 shows one specific embodiment of the rendering module 23 of FIG. 1. As can be seen from FIG. 6, the printer system 83 implements the rendering module 23 of FIG. 1, and is connected to the web access module 82 to print out the retrieved content by the web access module 82. The printer system 83 can be any known printer. For example, the printer system 83 can be a high speed high quality printer. As an another example, the printer system 83 can be a large printer system capable of printing color photographs. In addition and as described above, the printer system 83 can be replaced with other output or display systems. For example, the printer system 83 can be replaced with a projector, a large screen display, or a video/audio player.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A system for providing Internet-related services in response to a handheld device without requiring the handheld device to itself be Internet-enabled, comprising:
    a client module embedded in the handheld device to enable the handheld device to directly send a selected stored Universal Resource Locator (URL), without encryption, via a local communication link, wherein the URL indicates a desired Internet web page;
    a receiver that receives the URL sent from the handheld device via the local communication link;
    a web access module coupled to the receiver and to an external Internet via an Internet communication link different from said local communication link to access and retrieve the desired web page from a remote web server via the external Internet; and
    a render system being coupled to the web access module and physically separate from said handheld device, to render the retrieved web page in a human discernible format to a user on said render system.

2. The system of claim 1, wherein the handheld device fits into a user's palm.

3. The system of claim 1, further comprising a memory coupled with the handheld device to store at least one URL, wherein the URL sent is selected from the at least one URL.

4. The system of claim 1, further comprising a communication module in the handheld device that receives the URL from a remote site via a second communication link coupled to the communication module.

5. The system of claim 4, wherein the second communication link is a link to a wireless network.

6. The system of claim 1, wherein the handheld device is selected from a group of devices consisting of: a pager device, a cellular phone device, a personal organizer device, a watch device, a palm pilot device, and an information appliance device.

7. The system of claim 1, wherein the receiver, the web access module, and the render system all physically reside within a single enclosure separate from the handheld device.

8. The system of claim 1, wherein the local communication link is a wireless communication link.

9. The system of claim 8, wherein the wireless communication link is selected from a group of communication links consisting of: an infra-red communication link, a radio frequency communication link, a microwave communication link, a laser communication link, and combinations thereof.

10. The system of claim 1, wherein the web access module communicates with the remote web server via the Internet communication link using an open standard communication protocol.

11. The system of claim 10, wherein the open standard communication protocol is a Hyper Text Transport Protocol (HTTP).

12. The system of claim 1, wherein the render system further comprises at least one render system selected from a group of systems consisting of: a printer system, a display system, a projection display system, a user interface display system, an audio/video player system, a Web television system, and a combination thereof.

13. The system of claim 1, wherein the web access module comprises a web browser without a rendering function.

14. The system of claim 1, wherein the rendering system is a device-specific rendering system.

15. The system of claim 1, wherein the handheld device is a watch.

16. The system of claim 1, wherein the handheld device is a pager.

17. The system of claim 1, wherein said client module does not have Internet access function and does not include an Internet web browser application program or provide any direct connectivity to the Internet.

18. The system of claim 1, wherein said client module has Internet access function and includes an Internet web browser, but neither the Internet access function nor the Internet web browser are utilized to send the URL via the local communication link.

19. The system of claim 1, wherein only said URL is communicated, and said URL is communicated by sending only a few bytes of data.

20. The system of claim 1, wherein the URL is in the actual URL form or embedded in a hyperlink.

21. The system of claim 1, wherein the rendering system includes a printer external to said handheld device or a display screen device external to said handheld device.

22. The system of claim 1, wherein the rendering system includes an audio or video player system external to said handheld device.

23. A system for providing an Internet-related service from a remote Internet-related server via an Internet communication link based on a Universal Resource Locator (URL) indicated by a handheld device, comprising:

a receiver module to receive an unencrypted URL from the handheld device via a local communication link;

a web access module to access and retrieve the Internet-related service via the Internet communication link based on the unencrypted URL;

a render module, coupled to the web access module and physically separate from the handheld device, to render the retrieved Internet-related service in a human discernible format to a user on the render module.

24. The system of claim 23, wherein the render module further comprises at least one render system selected from a group of systems consisting of: a printer system, a display system, an information appliance, a projection display system, a user interface display system, an audio/video player system, a Web television system, and a combination thereof.

25. The system of claim 23, wherein the web access module communicates with the remote Internet-related server via the Internet communication link using an open standard communication protocol.

26. The system of claim 25, wherein the open standard communication protocol is a Hyper Text Transport Protocol (HTTP).

27. The system of claim 23, wherein the communication link is a wireless communication link.

28. The system of claim 27, wherein the wireless communication link is selected from a group of communication links consisting of: an infra-red communication link, a radio frequency communication link, a microwave communication link, a laser communication link, and combinations thereof.

29. A mobile system capable of communicating with a gateway module, which comprises a web access module to access and retrieve an Internet-related service from a remote Internet-related server via an Internet communication link based on a Universal Resource Locator (URL); and a render module to render the received Internet-related service, the mobile system comprising:

a client module to enable direct sending of the URL, without encryption, via a communication link to the gateway module for use in the access and retrieval of the Internet-related service, wherein the gateway module communicates the retrieved Internet-related service with the rendering module, which is physically separate from the mobile system, and is configured to render the retrieved Internet-related service in a human discernible format to a user on the rendering module.

30. The system of claim 29, further comprising a memory coupled with the mobile system to store at least one URL, wherein the URL sent is selected from the at least one URL.

31. The system of claim 30, further comprising a communication module to receive the URL from the gateway module.

32. A gateway system capable of receiving a communication including Universal Resource Locator (URL) via a communication link from a mobile system, said gateway system comprising:

a communication module to receive the communication from the mobile system, said communication including a selected unencrypted URL;

a web access module to access and retrieve an Internet-related service from a remote Internet-related server via an Internet communication link based on the unencrypted URL; and a render module to receive the retrieved Internet-related service from the web access module, said render module being physically separate from said mobile system and configured to render the retrieved Internet-related service in a human discernible format to a user on the render module.

33. The system of claim 32, further comprising a second communication module to send a second URL to the mobile system.

34. The system of claim 33, wherein each module of the gateway system physically resides within at least one enclosure separate from the mobile system.

* * * * *